Figure 1:
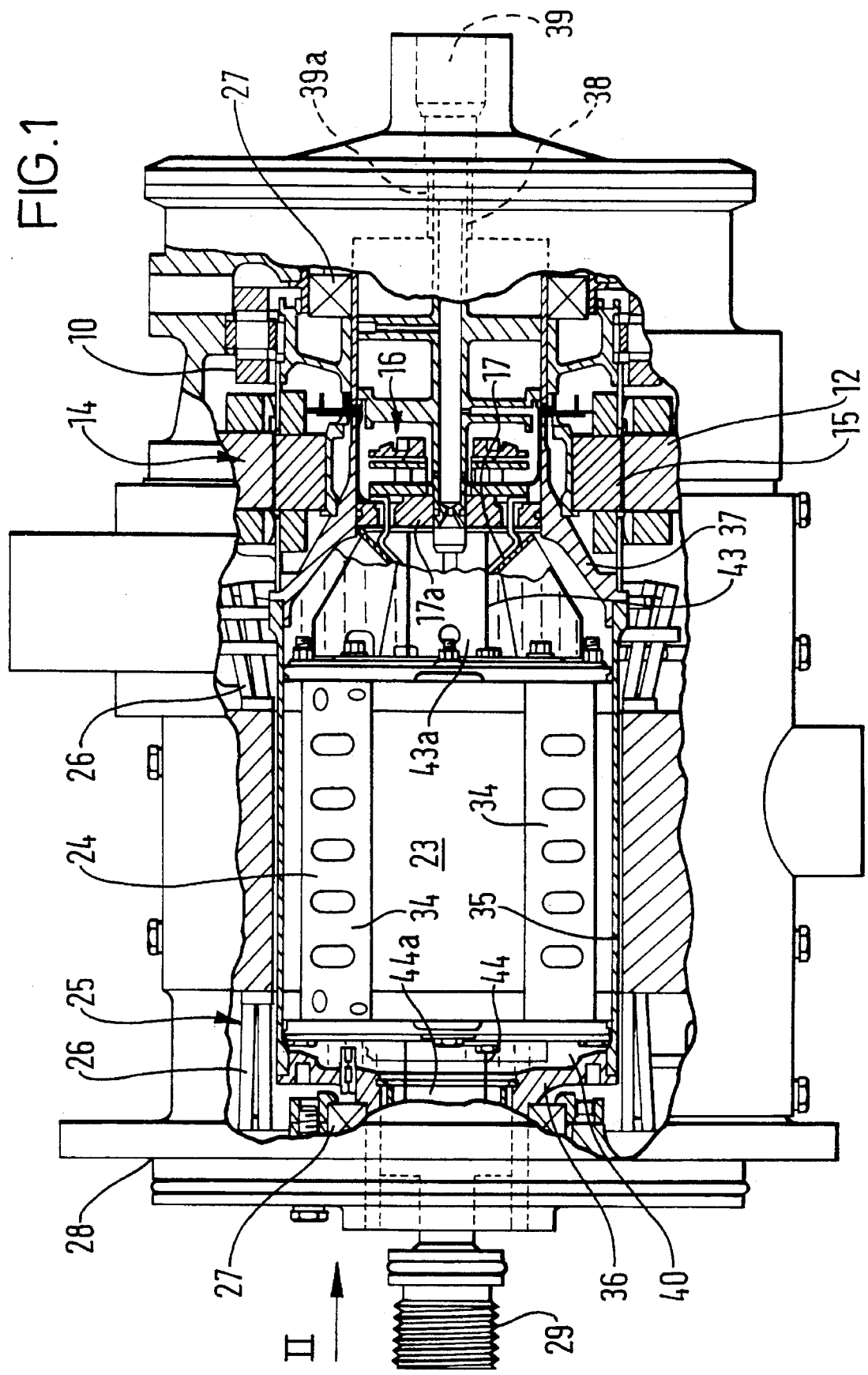

US005554898A

United States Patent [19]
Howard et al.

[11] Patent Number: 5,554,898
[45] Date of Patent: Sep. 10, 1996

[54] ROTARY GENERATOR

[75] Inventors: Rodney S. Howard, Hemel Hempstead; Mark E. Stephenson, Jersey Farm; Eric J. Topping, Watford, all of Great Britain

[73] Assignee: Lucas Industries PLC, Great Britain

[21] Appl. No.: 333,713

[22] Filed: Nov. 3, 1994

[30] Foreign Application Priority Data

Nov. 5, 1993 [GB] United Kingdom ............... 9322866

[51] Int. Cl.⁶ .................. H02K 1/32; H02K 9/02
[52] U.S. Cl. .................................... 310/61; 310/264
[58] Field of Search ........................ 310/61, 60 A, 310/54, 26 D, 264, 258, 259

[56] References Cited

U.S. PATENT DOCUMENTS

| | | | |
|---|---|---|---|
| 3,648,085 | 3/1972 | Fuji | 310/54 |
| 4,409,502 | 10/1983 | McCabria | 310/61 |
| 4,496,862 | 1/1985 | Weber | 310/54 |
| 5,019,733 | 5/1991 | Kano et al. | 310/61 |

FOREIGN PATENT DOCUMENTS

| | | |
|---|---|---|
| 2320655 | 6/1976 | France . |
| 2128418 | 4/1984 | United Kingdom . |
| WO80/01629 | 8/1980 | WIPO . |
| WO/91/07003 | 5/1991 | WIPO . |

Primary Examiner—Steven L. Stephan
Assistant Examiner—Judson H. Jones
Attorney, Agent, or Firm—Barnes & Thornburg

[57] ABSTRACT

A rotary generator comprises a rotor within a stator having end windings, the rotor defining a flow path for cooling fluid which, during rotation of the rotor forms an annular layer in the rotor. A cooling fluid feed means is provided having an inlet which, in use, is positioned within the annular layer of cooling fluid whereby a head of cooling fluid is formed at the inlet. The feed means defines a duct through which the cooling fluid passes by the action of centrifugal force towards an outlet from which cooling fluid is directed onto the end windings. The rotation of the rotor causes the head of fluid at the inlet to reduce with increasing rotational speed thereby effecting control of cooling fluid flow through the feed means as the rotational speed of the rotor increases.

13 Claims, 6 Drawing Sheets

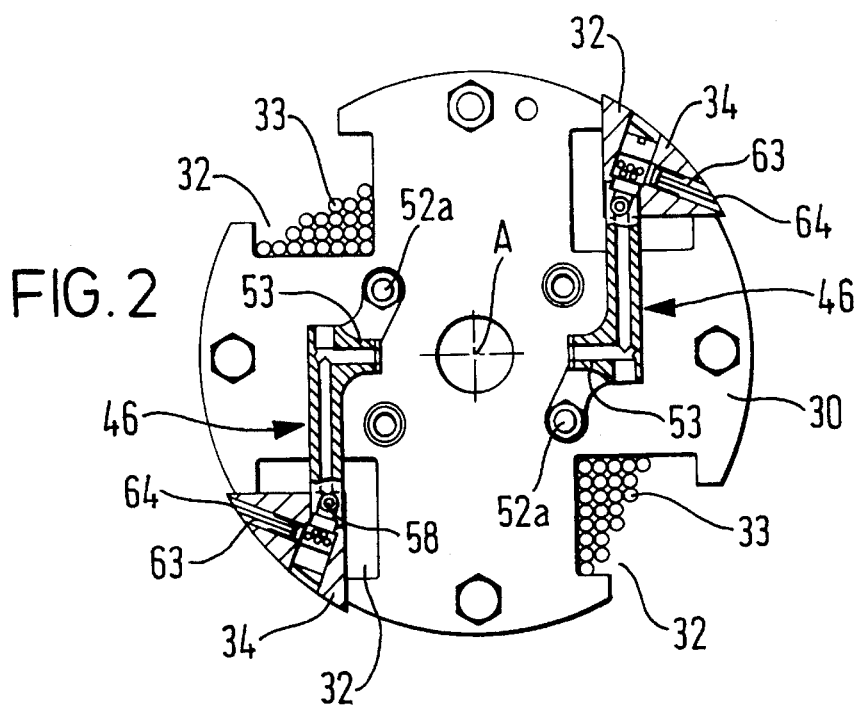
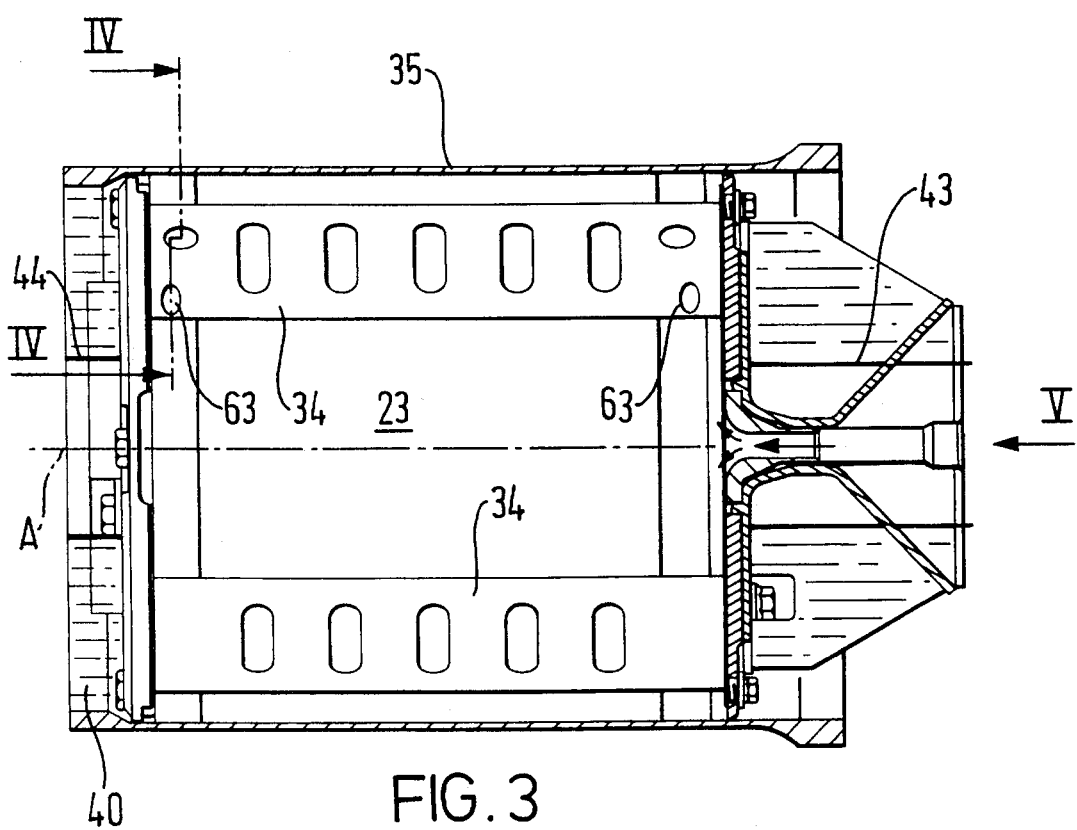

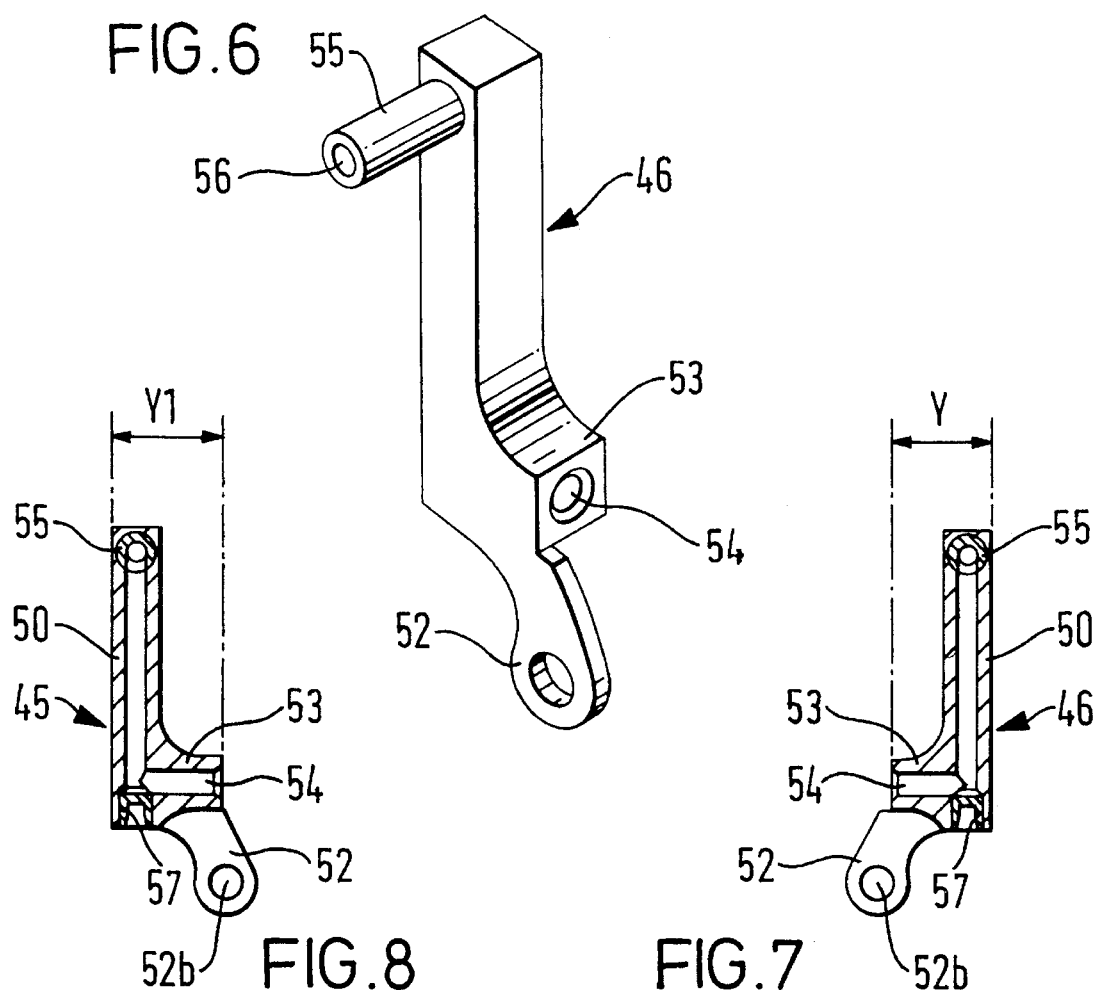
FIG.6
FIG.8
FIG.7
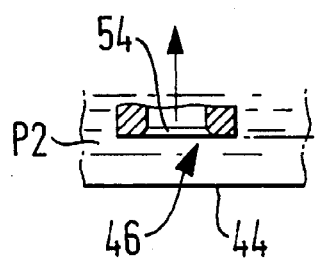
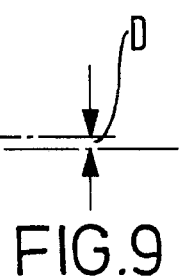
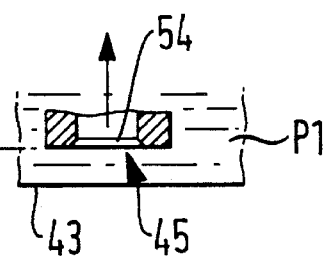
FIG.9
FIG.10
FIG.11

ROTARY GENERATOR

The invention relates to a rotary generator and is particularly concerned with a rotary generator which includes a stator having end windings and which provides for cooling of the end windings by means of a cooling fluid fed by centrifugal action.

It has been proposed in International Patent Application No. WO91/07003 to cool stator end windings by means of a cooling fluid fed centrifugally through a radial tube having a cooling orifice through which the fluid sprays onto the end windings. In order to provide a reasonably steady flow of cooling fluid for the end windings it is necessary in WO91/07003 to provide the radial tube with a variable orifice for limiting flow of cooling fluid when the generator operates at higher speeds. The arrangement requires the provision of a ball for varying the orifice and a biasing spring which acts upon the ball and the system is, therefore, somewhat complex.

An object of the present invention is to provide a rotary generator having an improved system for cooling the stator end windings.

According to the invention there is provided a rotary generator comprising a rotor within a stator having end windings, the rotor defining a flow path for cooling fluid which, during rotation of the rotor, forms an annular layer in the rotor, a cooling fluid feed means having an inlet which, in use, is positioned within the annular layer of cooling fluid whereby a head of cooling fluid is formed at the inlet, the feed means defining a duct through which the cooling fluid passes by the action of centrifugal force towards an outlet from which cooling fluid is directed onto the end windings, the rotation of the rotor causing the head of fluid at the inlet to reduce with increasing rotational speed thereby effecting control of cooling fluid flow through the feed means as the rotational speed increases.

With such an arrangement, the decreasing head helps to maintain a reasonably steady flow of cooling fluid to the end windings even though rotational speed of the rotor increases and does so without the use of moving parts to vary the size of an outlet orifice for the cooling fluid.

The flow path defined by the rotor preferably enables fluid to flow from one end of the rotor to an opposite end thereof so that a said annulus of oil will be formed at each end of the rotor. In such a case, cooling fluid feed means may be provided at each end of the rotor to enable end windings at each end of the stator to be cooled by the cooling fluid.

As the cooling fluid flows along the flow path between the fluid inlet end and the fluid outlet end of the rotor, it encounters resistance due to the presence of rotor windings and, therefore, the pressure of the cooling fluid at the outlet end will normally be smaller than the pressure of the cooling fluid at the inlet end of the rotor. In order to compensate for the fall in pressure of the cooling fluid, the inlet to the fluid feed means at the outlet end of the rotor may be positioned at a greater radial distance from the axis of rotation of the rotor than the inlet of the fluid feed means at the inlet end of the rotor. In that way, the head of oil at the inlet of the fluid feed means at the outlet end of the rotor will normally be greater than the head of fluid at a higher pressure at the inlet end of the rotor. By such an arrangement, fluid will flow at somewhat similar rates through the fluid feed means at both ends of the rotor. In that way, the risk of the end windings at one end of the stator receiving substantially less cooling fluid than the end windings at the other end of the stator is minimised.

The inlet of the or each fluid feed means preferably faces radially inwardly.

The fluid feed means preferably comprises an elongate tubular member which may have a transverse tube at one end defining the inlet and a transverse tube at its other end defining the outlet. The inlet and outlet tubes preferably extend in mutually perpendicular planes. The inlet tube preferably extends radially and the elongate tubular member preferably extends at right angles to the inlet tube towards the periphery of the rotor.

The aforesaid outlet tube preferably communicates with a bore leading to an outlet orifice through which the cooling fluid is sprayed onto the end windings. The outlet orifice is preferably defined at one end of a duct which is preferably inclined rearwardly in relation to the direction of rotation of the rotor.

A further cooling fluid feed means may be arranged with its inlet at a position diametrically opposed to the inlet of the first fluid feed means. Two such fluid feed means may be arranged at both the inlet and the outlet ends of the rotor.

The fluid feed means preferably includes a mounting lug by which it can be attached to the rotor.

Figure 4:
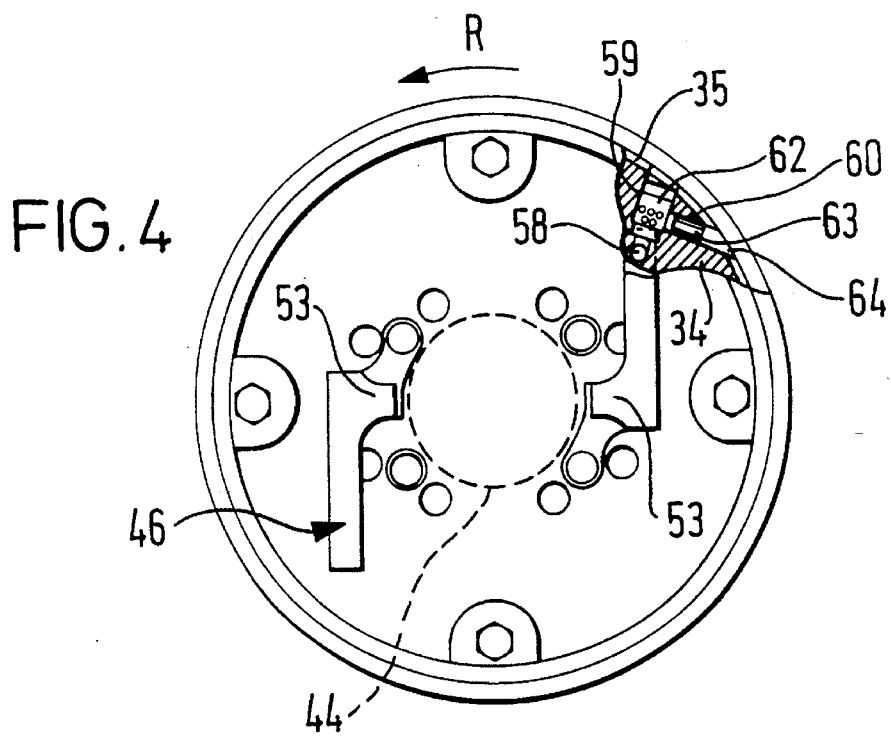
Figure 5:
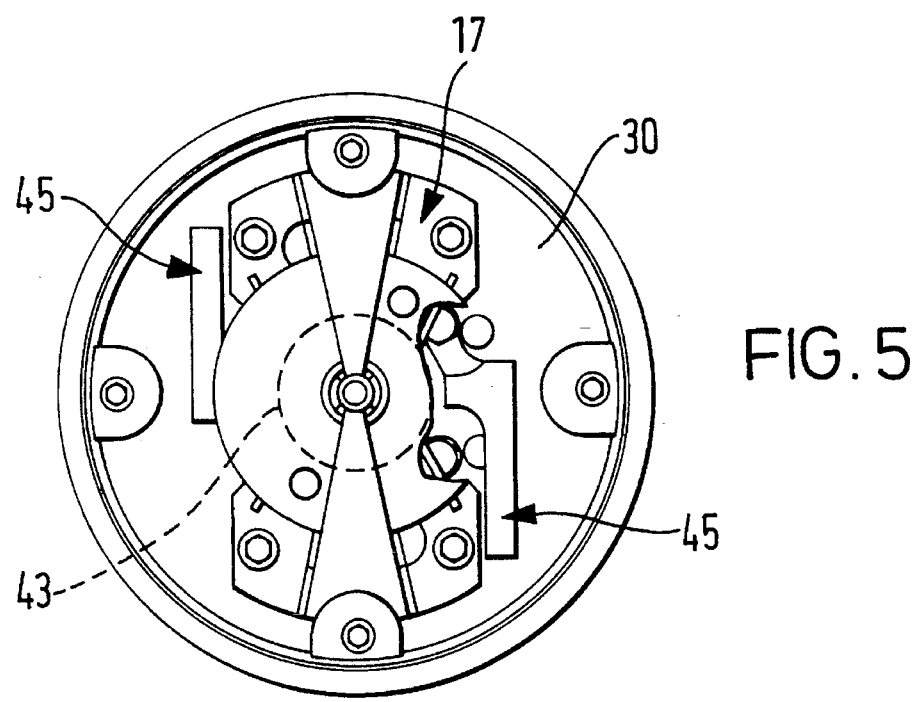
Figure 12:
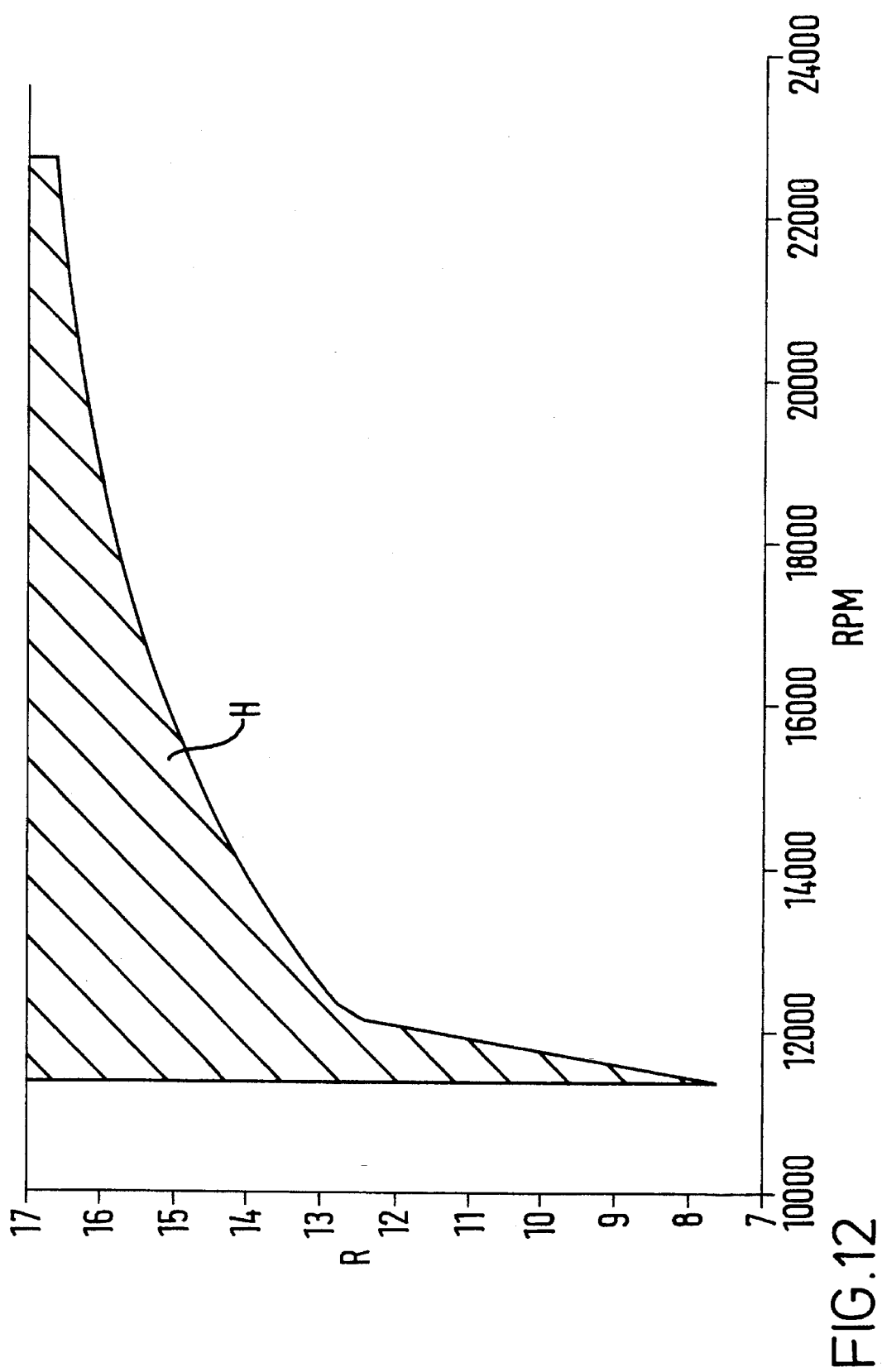
Figure 13:
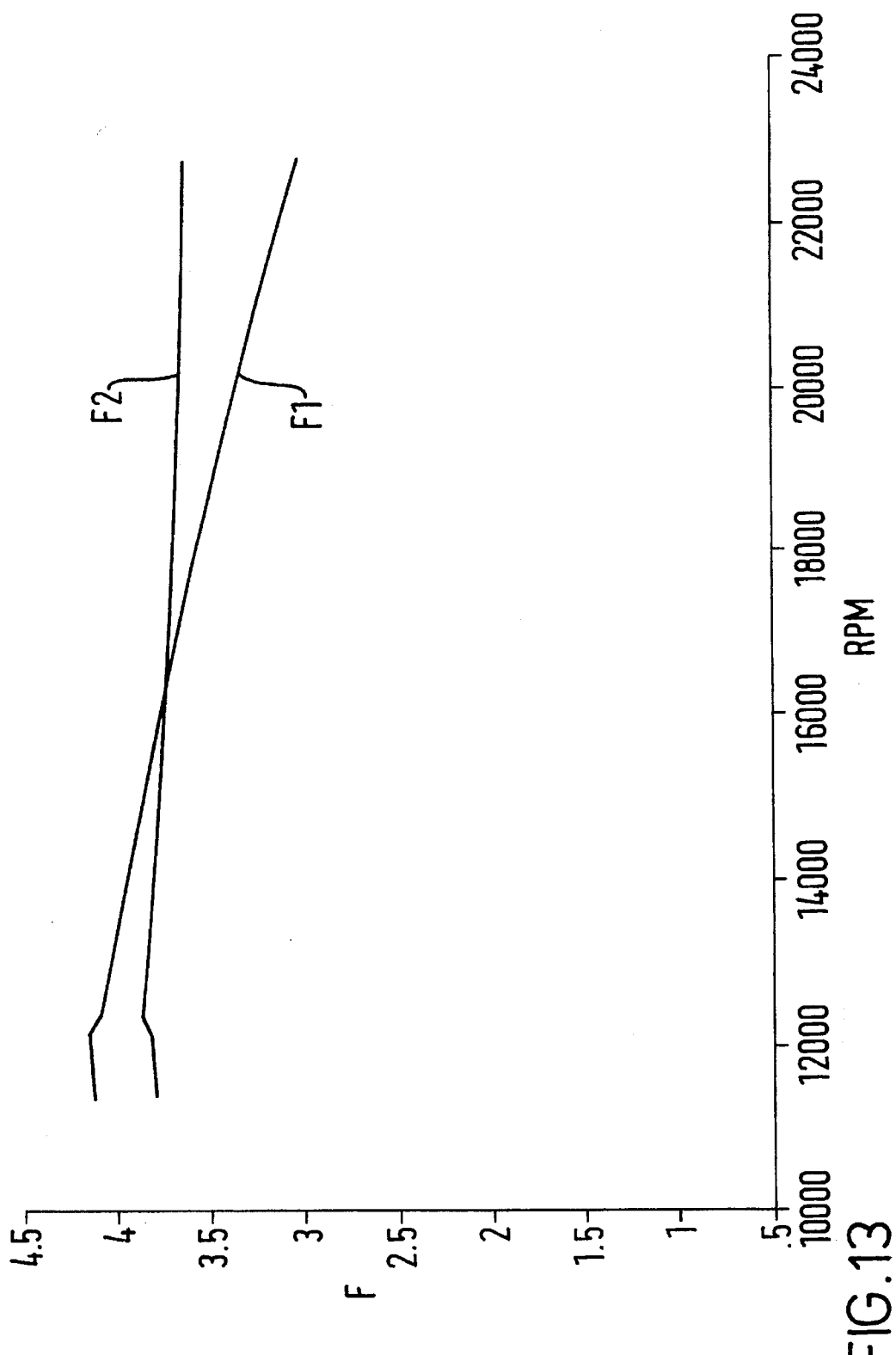

A rotary generator in accordance with the invention will now be described by way of example with reference to the accompanying drawings in which:

FIG. 1 is a cross section through a rotary generator incorporating an improved system for cooling the stator end windings in accordance with the invention, FIG. 2 is an end view of the rotor of the generator in FIG. 1 looking generally in the direction of arrow II in FIG. 1 and showing fluid feed members in cross section and drawn to a larger scale, FIG. 3 is an elevation of part of the rotor of the generator shown in FIG. 1, FIG. 4 is a cross section through part of the rotor shown in FIG. 3 on the line IV—IV in FIG. 3, FIG. 5 is an end view of part of the rotor shown in FIG. 3 looking in the direction of arrow V in FIG. 3, FIG. 6 is a perspective view of a cooling fluid feed member of one hand as mounted on the left-hand end of a core of the rotor viewed in FIG. 3, FIG. 7 is an a longitudinal cross section through the fluid feed member shown in FIG. 6, FIG. 8 is a cross section similar to FIG. 7 through a fluid feed member of opposite hand and of the kind mounted at the right-hand end of the rotor core, FIG. 9 is a diagrammatic view illustrating different radial positioning of fluid feed member inlets at opposite ends of the rotor core, FIGS. 10 and 11 are diagrammatic views showing the way in which the head of cooling fluid at the inlet to a fluid feed member reduces with increasing rotational speed of the rotor, FIG. 12 is a graph showing the way in which the head of cooling fluid varies with rotational speed, and FIG. 13 is a graph showing flow of cooling fluid flow in relation to rotational speed.

Referring to FIG. 1, a permanent magnet generator 10 supplies current to the stator 12 of an exciter generator 14. Alternating current induced in a rotor 15 of the exciter generator is supplied to a rectifier arrangement 16 mounted on a mounting 17. The rectifier arrangement 16 supplies current to windings of a rotor 23. Main generator output power is derived from a stator 24 having windings 25 which co-operate with the rotating magnetic field provided by the rotor 23. The windings 25 of the stator 24 extend beyond the left and right-hand ends of the body of the stator as viewed in FIG. 1 and form overhanging end windings 26. The rotor 23 is rotatable within bearings 27 supported by a main generator housing 28 and receives drive at a splined hollow shaft 29. The rotor 23 comprises a core 30 (FIG. 2) having, in the example shown, four recesses 32 which receive windings 33 (some of which are shown in two recesses only in FIG. 2) the windings are secured in position by means of wedges 34 in known manner and the periphery of the core is surrounded by a sheet metal tube 35 extending between an end plate 36 and a conical tubular support 37 in known manner. The rotor 23 includes a tubular shaft 38 through which cooling fluid, normally a cooling oil, can flow to cool the generator. The right-handed end of the tubular shaft 38 extends retractably into a tube 39a associated with an inlet port 39. The oil is pumped through the inlet port 39 in the housing 28 and flows out of tube 39a and along the tube 38 into the interior of the rectifier mounting 17. The rectifier mounting includes an end plate 17a which sealingly engages the interior surface of the conical tubular support 37. The cooling fluid can flow through the recesses 32 between the windings 33 and emerges at the opposite end, i.e. the outlet end of the rotor 23 into a space 40 defined between the adjacent end of the rotor core 30, the end plate 36 and the adjacent section of the sheet metal tube 35.

Cooling fluid pumped through the rotor from the inlet 39 is thrown outwardly by centrifugal force during rotation of the rotor 23 so as to form an annulus 43 of cooling fluid at the inlet end of the rotor 23 and the further annulus of cooling fluid 44 at the outlet end of the rotor. The generator 10 previously described with respect to FIG. 1 is of a known kind. Each annulus of cooling fluid surrounds a core of air 43a, 44a respectively.

In accordance with the present invention, the generator of FIG. 1 is provided with a system for cooling the end windings 26 of the stator 24 which utilises the annulus of cooling fluid 43, 44 at each end of the rotor 23.

As shown in FIGS. 2 to 5, the inlet and outlet ends of the rotor 23 are provided with fluid feed members 45, 46 respectively. The fluid feed members 46 are shown in cross-section in FIG. 2.

The fluid feed members 45 are arranged on the inlet end of the core of rotor 23 outside the rectifier mounting 17 and the fluid feed members 46 are arranged on the outlet end of the core 32. In FIGS. 4 and 5, the radially inner boundary of each annulus of cooling fluid 43, 44 is shown in broken lines.

The construction of the fluid feed members can be seen clearly from FIGS. 6 to 8, FIGS. 6 and 7 illustrating a fluid feed member 46 and FIG. 8 illustrating a fluid feed member 45. It will be noted that the fluid feed members 45, 46 are mirror images of each other except that the dimension Y shown in FIG. 7 is smaller than the dimension Y1 in FIG. 8 for reasons which will be explained below.

The fluid feed members 45, 46 each comprise an elongate tubular member 50 having a mounting lug 52 at its lower end as viewed in FIGS. 7 to 9 formed with a bore 52b for receiving a mounting bolt 52a which screws into the adjacent end of the rotor core 30 (see FIG. 2). An integral inlet tube 53 extends transverse to the tube 50 and defines an inlet opening 54. The upper end of the elongate tube 50 is integral with an outlet tube 55 defining an outlet 56. It will be noted that the inlet and outlet tubes 53, 55 extend in mutually perpendicular planes. The lower end of the elongate tube 50 has its bore closed by means of a stopper 57.

As shown in FIGS. 2, 4 and 5, the inlet tubes 53 extend radially with respect to the axis of rotation A of the rotor 23 and the elongate tubes 50 extend at right angles thereto outwardly towards the periphery of the rotor. End sections of the wedges 34 adjacent the ends of the core 30 are formed with axially extending bores 58 (see FIG. 4) which receive the respective outlet tubes 55 of the fluid feed members 45, 46. Each bore 58 communicates with an outwardly extending bore 59 in the associated wedge which continues at its outer end through the sheet metal tube 35. The bore 59 contains and is closed by a strainer 62 and communicates with an outlet duct 60 drilled in the wedge 34, the duct 60 being inclined rearwardly with respect to the direction of rotation R of the rotor 23. The duct 60 is provided with a jet 63 (see FIGS. 2 and 3) to provide a spray outlet 64.

As the rotor 23 rotates and each annulus of cooling fluid 43, 44 develops, the inlets 54 of the fluid feed members 45, 46 will lie within each annulus of fluid as shown in FIG. 9 the radially inner boundary of which is shown by a solid line. Therefore, a head of cooling fluid is formed over the inlet of each fluid feed member.

As mentioned above, the distance Y for the fluid feed member 46 is smaller than the distance Y1 of the fluid feed member 45. As the cooling fluid passes from the inlet end of the rotor 23 to the outlet end, the resistance encountered due to the presence of the windings 33 creates a drop in fluid pressure from a pressure P1 at the inlet end to a pressure P2 at the outlet end. It will be appreciated that centrifugal force will cause cooling fluid to pass through the tubular fluid feed members 45, 46 entering the inlets 54, passing through the outlets 56 and eventually flowing to the spray outlets 64 of the jets 63.

In order to ensure that the flow through the fluid feed members 45, 46 will be substantially similar despite the drop in pressure, the difference in distances Y1 positions the inlet 54 of fluid feed member 46 radially outward by distance D relative to the inlet of the fluid feed member 45. In that way, the inlet 54 of the fluid feed member 46 will be provided with a slightly greater head of fluid than the inlet 54 of fluid feed member 45. The difference between the two heads compensates for the effect of pressure drop.

As the rotational speed increases, there will be a tendency for the fluid to flow through the fluid feed members at a greater speed and it is desirable to maintain a fairly constant flow of fluid through the fluid feed members rather than a flow which increases substantially with increasing speed. However, it will be appreciated, that as fluid leaves each annulus 43, 44 through the inlets 54 with increasing speed, the head of fluid over each inlet 54 will decrease for a given rate of feed of the fluid into the inlet 39. That can be appreciated from FIGS. 11 and 12. At a first rotational speed, the head H1 over the inlet 54 of fluid feed member 45 is formed. However, with increasing rotational speed the head H1 decreases to H2 thereby reducing the head of fluid and reference is made to FIG. 12 in that respect. From FIG. 12 it can be seen that as rotational speed (RPM) increases, the radius R of each core of air 43a, 44a increases and the head H of cooling fluid therefore decreases. Reference is also made to FIG. 13 which shows flowrate F against rotational speed RPM. FIG. 13 shows flowrates F1, F2 through the inlets 54 at the inlet and outlet ends of the rotor respectively. It can be seen that the flowrates at the inlets vary only slightly despite substantially doubling the rotational speed from around 12000 to 24000 RPM. Also, the flowrate F1 is not substantially different from F2 at given speeds and the two flowrates are particularly close near the middle of the speed range. The cooling arrangement of the present invention optimises cooling and minimises the risk of erosion of the insulation coating on the coil end windings 26 which could otherwise occur if very high speed jets of fluid were to leave the spray outlets 64.

What we claim is:

1. A rotary generator comprising a stator having end windings, a rotor within the stator, the rotor defining a flow path for cooling fluid which, during rotation of the rotor, forms an annular layer in the rotor around a core of air, the rotor including a cooling fluid feed means extending into the annular layer of cooling fluid and having an inlet and an outlet Orifice of fixed size, the inlet, in use, being positioned within the annular layer of cooling fluid whereby a head of cooling fluid is formed at the inlet between the inlet and the core of air, the feed means defining a duct through which the cooling fluid passes by action of centrifugal force towards the outlet from which cooling fluid is directed onto the end windings, the rotation of the rotor causing the head of fluid at the inlet to reduce with increasing rotational speed thereby affecting control of cooling fluid flow through the feed means as the rotational speed increases.

2. A rotary generator according to claim 1 in which the flow path defined by the rotor enables fluid to flow from one end of the rotor to an opposite end thereof so that said annular layer of oil will be formed at each end of the rotor.

3. A rotary generator according to claim 2 in which the rotor has cooling fluid feed means at each end to enable the end thereof windings at each end of the stator to be cooled by the cooling fluid.

4. A rotary generator according to claim 3, in which the inlet to the cooling fluid feed means at an outlet end of the rotor is positioned at a greater radial distance from an axis of rotation of the rotor than the inlet of the cooling fluid feed means at an inlet end of the rotor.

5. A rotary generator according to claim 1 in which the inlet of the cooling fluid feed means faces radially inwardly.

6. A rotary generator according to claim 1 in which the cooling fluid feed means comprises an elongate tubular member which has an inlet transverse tube at its end defining the inlet orifice and an outlet transverse tube at its end defining the outlet orifice.

7. A rotary generator according to claim 6 in which the inlet and outlet transverse tubes extend in mutually perpendicular planes with respect to each other.

8. A rotary generator according to claim 7 in which in the inlet tube extends radially and the elongated tubular member extends at right angles to the inlet tube towards a periphery of the rotor.

9. A rotary generator according to claim 6 in which the cooling fluid feeds means includes a bore, the outlet orifice communicating with the bore, the outlet transverse tube communicates with the bore, the bore leading to the outlet orifice through which the cooling fluid is sprayed onto the end windings.

10. A rotary generator according to claim 9 in which the cooling fluid feed means defines an outlet duct in communication with the outlet tube, the outlet orifice being defined at one end of the outlet duct, the outlet duct being inclined rearwardly in relation to the direction of rotation of the rotor.

11. A rotary generator according to claim 1 in which further cooling fluid feed means is provided and the further cooling fluid feed means is arranged with its inlet at a position diametrically opposed to the inlet of the first feed means.

12. A rotary generator according to claim 11 in which two such cooling fluid feed means are provided and arranged at both the inlet and the outlet ends of the rotor.

13. A rotary generator according to claim 1 in which the cooling fluid means includes a mounting lug by which it can be attached to the rotor.

* * * * *